(12) United States Patent
Lange

(10) Patent No.: US 6,928,814 B2
(45) Date of Patent: Aug. 16, 2005

(54) HYDRAULIC FLUID CONTAINER FOR A VEHICLE HYDRAULIC BRAKE SYSTEM

(75) Inventor: Hans-Christoph Lange, Nörtershausen (DE)

(73) Assignee: Lucas Automotive GmbH (DE)

( * ) Notice: Subject to any disclaimer, the term of this patent is extended or adjusted under 35 U.S.C. 154(b) by 1 day.

(21) Appl. No.: 10/764,285

(22) Filed: Jan. 23, 2004

(65) Prior Publication Data

US 2004/0148931 A1 Aug. 5, 2004

Related U.S. Application Data

(63) Continuation of application No. PCT/EP02/07851, filed on Jul. 15, 2002.

(30) Foreign Application Priority Data

Jul. 23, 2001 (DE) .......................................... 101 35 793

(51) Int. Cl.[7] ................................................ B60T 11/26
(52) U.S. Cl. ........................................................ 60/585
(58) Field of Search ...................... 60/582, 585; 91/432; 206/335, 825; 220/202, 203.23

(56) References Cited

U.S. PATENT DOCUMENTS

| | | | |
|---|---|---|---|
| 3,233,411 A | | 2/1966 | Schubert |
| 3,389,715 A | * | 6/1968 | Hugh et al. .................. 220/202 |
| 3,952,918 A | * | 4/1976 | Poitras et al. .................. 222/82 |
| 4,934,144 A | | 6/1990 | Larin |

FOREIGN PATENT DOCUMENTS

| | | |
|---|---|---|
| DE | 1 530 757 | 5/1969 |
| DE | 39 12 110 | 10/1990 |
| EP | 0 340 186 | 9/1989 |
| GB | 2 114 246 | 8/1983 |
| GB | 2 230 831 | 10/1990 |

OTHER PUBLICATIONS

Document Bibliography and Abstract for EP 0 340 186 from the European Patent Office website: http://v3.espacenet.com/textdoc?sf=n&FIRST=1&F=0&CY=ep&LG=en&DB=EPODOC&PN=EP0340186&Submit=SEARCH&IDX=EP0340186, printed Jan. 12, 2004.

Document Bibliography and Abstract for DE 1 530 757 from the European Patent Office website: http://v3.espacenet.com/textdoc?sf=n&FIRST=1&F=0&CY=ep&LG=en&DB=EPODOC&PN=DE1530757&Submit=SEARCH&IDX=DE1530757, printed Jan. 12, 2004.

Document Bibliography and Abstract for DE 39 12 110 from the European Patent Office website: http://v3.espacenet.com/textdoc?sf=n&FIRST=1&F=0&CY=ep&LG=en&DB=EPODOC&PN=DE3912110&Submit=SEARCH&IDX=DE3912110, printed Jan. 12, 2004.

* cited by examiner

*Primary Examiner*—Edward K. Look
*Assistant Examiner*—Michael Leslie
(74) *Attorney, Agent, or Firm*—MacMillan, Sobanski & Todd, LLC

(57) ABSTRACT

A hydraulic fluid container (10) for a vehicle hydraulic brake system comprises at least one connecting sleeve (14), in which a valve member (20) is displaceably guided. The valve member (20) in a first position, into which it is spring-biased, blocks the connecting sleeve (14) and in a second position clears the connecting sleeve (14). On its circumferential surface the valve member (20) is provided with at least one radially elastic detent element (32; 32'). The connecting sleeve (14) in its inner side wall (36) has at least one recess, into which the detent element (32; 32') latches during introduction of the valve member (20) into the connecting sleeve (14) and which in relation to the direction of displacement of the valve member (20) forms a stop, which defines the first position of the valve member (20).

13 Claims, 2 Drawing Sheets

HYDRAULIC FLUID CONTAINER FOR A VEHICLE HYDRAULIC BRAKE SYSTEM

CROSS REFERENCE TO RELATED APPLICATIONS

This application is a continuation of International Application No. PCT/EP02/07851 filed Jul. 15, 2002, the disclosures of which are incorporated herein by reference, which claims priority to German Patent Application No. 101 35 793.1 filed Jul. 23, 2001, the disclosures of which are incorporated herein by reference.

BACKGROUND OF THE INVENTION

The invention relates to a hydraulic fluid container for a vehicle hydraulic brake system, having at least one connecting sleeve, in which there is displaceably guided a valve member, which in a first position, into which it is spring-biased, blocks the connecting sleeve and which in a second position clears the connecting sleeve. Such a hydraulic fluid container is known from DE 39 12 110 A1, and corresponding GB Patent No. 2 230 831, both of which are incorporated by reference herein.

Hydraulic fluid containers of this type are installed as brake fluid containers in vehicles having a hydraulic brake system and in the operable state of the vehicle brake system are connected in a fluid-transferring manner to a master cylinder. Under certain circumstances, e.g. as a result of an accident or for repair of the vehicle, what may however occur is that the brake fluid container is separated from the master cylinder. There is then a danger that the brake fluid, which as a rule consists of highly toxic poly glycol compounds, may leak out of the brake fluid container and pass into the environment. Leaking brake fluid may moreover, in the event of contact with heated engine parts, ignite and trigger a vehicle fire. For these reasons, such brake fluid containers usually comprise a leak protection valve, which clears the fluid-transferring connection between the brake fluid container and the master cylinder so long as the brake fluid container and the master cylinder are connected into a subassembly and which closes the container as soon as the brake fluid container is separated from the master cylinder.

In the case of the brake fluid container known from DE 39 12 110 A1, a leak protection valve comprises a valve member disposed in a connecting sleeve of the brake fluid container and having a closing body and an actuating element. When the brake fluid container is connected to the master cylinder of a vehicle brake system, the actuating element is supported against the master cylinder housing and therefore holds the valve member in its open position counter to the action of a spring, which is supported against a support plate disposed in the interior of the brake fluid container. In the event of separation of the brake fluid container from the master cylinder, the closing body is moved by the bias of the spring into abutment with a sealing seat formed on the connecting sleeve, with the result that the brake fluid container is closed. This known brake fluid container has the drawback that the valve member has to be introduced into the connecting sleeve from the inside of the brake fluid container. The spring and the support plate for the spring then have to be fitted in a second operation inside the brake fluid container once the valve member is disposed in its position in the connecting sleeve. In the case of this known brake fluid container, mounting of the valve member as well as of the spring and the support plate is accordingly complex and therefore expensive.

SUMMARY OF THE INVENTION

The underlying object of the invention is to provide a hydraulic fluid container of the initially described type with a leak protection valve that is quick and easy to mount.

This object is achieved according to the invention by a hydraulic fluid container having the features of claim 1. For mounting, the valve member having the at least one radially elastic detent element is easily introduced from the outside into the connecting sleeve of the hydraulic fluid container. In said case, an elastic, radially inwardly directed deformation of the at least one detent element occurs. As soon as the valve member is situated in a predetermined position in the connecting sleeve, the restoring forces resulting from this elastic deformation ensure that the detent element is restored in a radially outward direction, with the result that the detent element latches in the at least one recess, which is formed in the inner side wall of the connecting sleeve.

In the mounted state the valve member is displaceable in the connecting sleeve between its first position, in which it blocks the connecting sleeve, and its second position, in which it clears the connecting sleeve, wherein it is pressed by means of a spring bias into its first position. The recess formed in the inner side wall of the connecting sleeve in said case acts as a stop, which defines the first position of the valve member. This stop in cooperation with the at least one detent element limits the displacement of the valve member in the connecting sleeve and prevents the valve member from being displaced beyond its first position in the connecting sleeve as a result of the spring bias.

Instead of the recess formed in the inner side wall of the connecting sleeve, a detent projection formed on said inner side wall may be provided. During mounting the at least one detent element then latches with the detent projection, and in the mounted state of the valve member the detent projection acts as the stop defining the first position of the valve member. Both described forms of construction of the hydraulic fluid container according to the invention have the advantage that the valve member may be mounted very easily and quickly in the connecting sleeve of the hydraulic fluid container and at the same time guarantees reliable protection against leaks.

According to a development of the invention the connecting sleeve extends into the hydraulic fluid container, wherein the part of the connecting sleeve situated in the hydraulic fluid container has substantially the same inside diameter as a part of the connecting sleeve projecting from the hydraulic fluid container, and wherein the at least one recess for the at least one detent element is preferably formed in the part of the connecting sleeve situated in the hydraulic fluid container. Given such an arrangement, the valve member is latched by means of the at least one radially elastic detent element in the interior of the hydraulic fluid container. The detent connection is then well protected from damage, so that even in the event of a mechanical stress acting upon the hydraulic fluid container, e.g. as a result of an accident, the risk of damage or destruction of the leak protection valve is low. The part of the connecting sleeve situated in the hydraulic fluid container need not have exactly the same inside diameter as the part projecting from the hydraulic fluid container, rather it may be slightly smaller or even slightly larger. It is merely necessary to ensure that the deformation displacement, which the radially elastic detent element may execute, is still sufficient for reliable latching in the recess of the connecting sleeve.

The valve member may comprise a first and a second portion. In the first portion the at least one detent element is then disposed and the second portion extends in the direction of the opening of the connecting sleeve and acts as an actuating tappet for the valve member. In its actuating position the actuating tappet presses the valve member into its second position counter to the spring bias. When, on the other hand, the actuating tappet is not actuated, the valve member is displaced into its first position as a result of the spring bias. Usually the actuating tappet is supported in such a way on the housing of a master cylinder that it occupies its actuating position so long as the hydraulic fluid container is connected to the master cylinder. The valve member is then situated in its second position and clears the connecting sleeve and hence a fluid connection between the hydraulic fluid container and the master cylinder. In the event of separation of the hydraulic fluid container from the master cylinder, the actuating tappet is cleared and the valve member is displaced by the spring bias acting upon it into its first position, in which it blocks the connecting sleeve. By virtue of this development of the valve member safe and reliable operation of the valve is guaranteed in a simple manner.

Preferably, the first portion of the valve member is hollow-cylindrical and receives one end of a spring, which biases the valve member and is supported by its other end against the part of the connecting sleeve situated in the hydraulic fluid container, e.g. against the side wall of the connecting sleeve. Such an arrangement is particularly easy and economical to manufacture and mount and guarantees a secure mounting of the spring in the connecting sleeve. In the first position of the valve member the bias of the spring is transmitted via the detent element to the stop, which is formed by the recess in the inner side wall of the connecting sleeve, while in the second position of the valve member the bias counteracts a force summoned up by the actuating tappet.

According to a form of construction of the invention the spring is supported against a partially breached end wall, which forms one end of the part of the connecting sleeve situated in the hydraulic fluid container. Through the breach formed in the end wall hydraulic fluid may flow from the hydraulic fluid container into the connecting sleeve and out of the container when the valve member is situated in its second position.

According to a further form of construction of the hydraulic fluid container according to the invention the spring is supported against an end wall, which closes the part of the connecting sleeve situated in the hydraulic fluid container, and the recess formed in the inner side wall of the connecting sleeve and interacting with the detent element takes the form of a breach. This development is advantageous because the spring may be well supported against the continuous and hence stable end wall and the breach formed in the side wall of the connecting sleeve enables particularly secure and easy latching of the radially elastic detent element during mounting of the valve member. When the valve element is situated in its second position, the hydraulic fluid in the hydraulic fluid container may flow through the breach in the side wall of the connecting sleeve into the connecting sleeve and in the opposite direction.

The construction of a seal, which seals off the connecting sleeve of the hydraulic fluid container in the first position of the valve member, may be effected in various ways. Here, a factor to be considered is that there is no significant pressure difference between the fluid in the hydraulic fluid container and the connecting sleeve and so the demands placed on a seal are lower than, for example, in a pressurized system. According to a first form of construction the valve member on its outside comprises an annular sealing collar, which projects slightly in radial direction and which in the first position of the valve member interacts with an annular sealing seat, which projects slightly in a radially inward direction and is provided at the inner surface of the connecting sleeve. The annular sealing collar and the valve member may be formed from a uniform material, and the annular sealing seat and the connecting sleeve may be formed from a uniform material. As the sealing collar and the sealing seat are conveyed past one another during mounting of the valve member, they each have to be dimensioned and elastically deformable in such a way that they are not damaged thereby. While the sealing collar in the second position of the valve member is situated in a position raised off the sealing seat, in the first position of the valve member it moves into abutment with the sealing seat so that, as a consequence thereof, the connecting sleeve of the hydraulic fluid container is sealed. A seal produced in this manner is economical to manufacture and guarantees reliable sealing of the hydraulic container.

According to a second form of construction the valve member on its outside comprises an annular sealing collar, which projects slightly in radial direction and is in contact with the inner surface of the connecting sleeve, wherein the annular sealing collar is formed by an O-ring seal. A valve member developed in this manner is particularly easy and economical to manufacture since, because of the elastic bias of the O-ring seal, there is no need to dispose a sealing seat at the inner surface of the connecting sleeve. What is more, the O-ring seal is sufficiently elastically deformable in radial direction to prevent its being damaged during mounting of the valve member.

The annular sealing collar is preferably disposed between the first portion and the second portion of the valve member.

The at least one detent element formed on the valve member may also be developed in various ways. According to a form of construction of the hydraulic fluid container according to the invention the and/or each elastic detent element is formed by a tongue, which is fastened to the valve member and pivotable about an axis parallel to the centre line of the valve member. During mounting of the valve member this tongue is pressed radially inwards in order to allow introduction of the valve member into the connecting sleeve of the hydraulic fluid container. Once the valve member has reached its predetermined position in the connecting sleeve, the tongue is moved, as a result of the restoring forces resulting from its elastic deformation, back into its original position and latches securely with the recess in the inner side wall of the connecting sleeve.

According to a further form of construction of the hydraulic fluid container according to the invention the and/or each elastic detent element is formed by a tongue, which is fastened to the valve member and pivotable about an axis, which extends tangentially relative to the circumferential direction of the valve member. A valve member constructed in such a manner is particularly easy to assemble since during introduction of the valve member into the connecting sleeve the or each tongue is automatically deformed in a radially inward direction, thereby allowing the valve member to be introduced easily and without canting into the connecting sleeve of the hydraulic fluid container.

The valve member is preferably an integral plastic injection moulded part. Such a part may be manufactured easily and economically with the necessary precision.

DETAILED DESCRIPTION OF THE INVENTION

Figure 1:
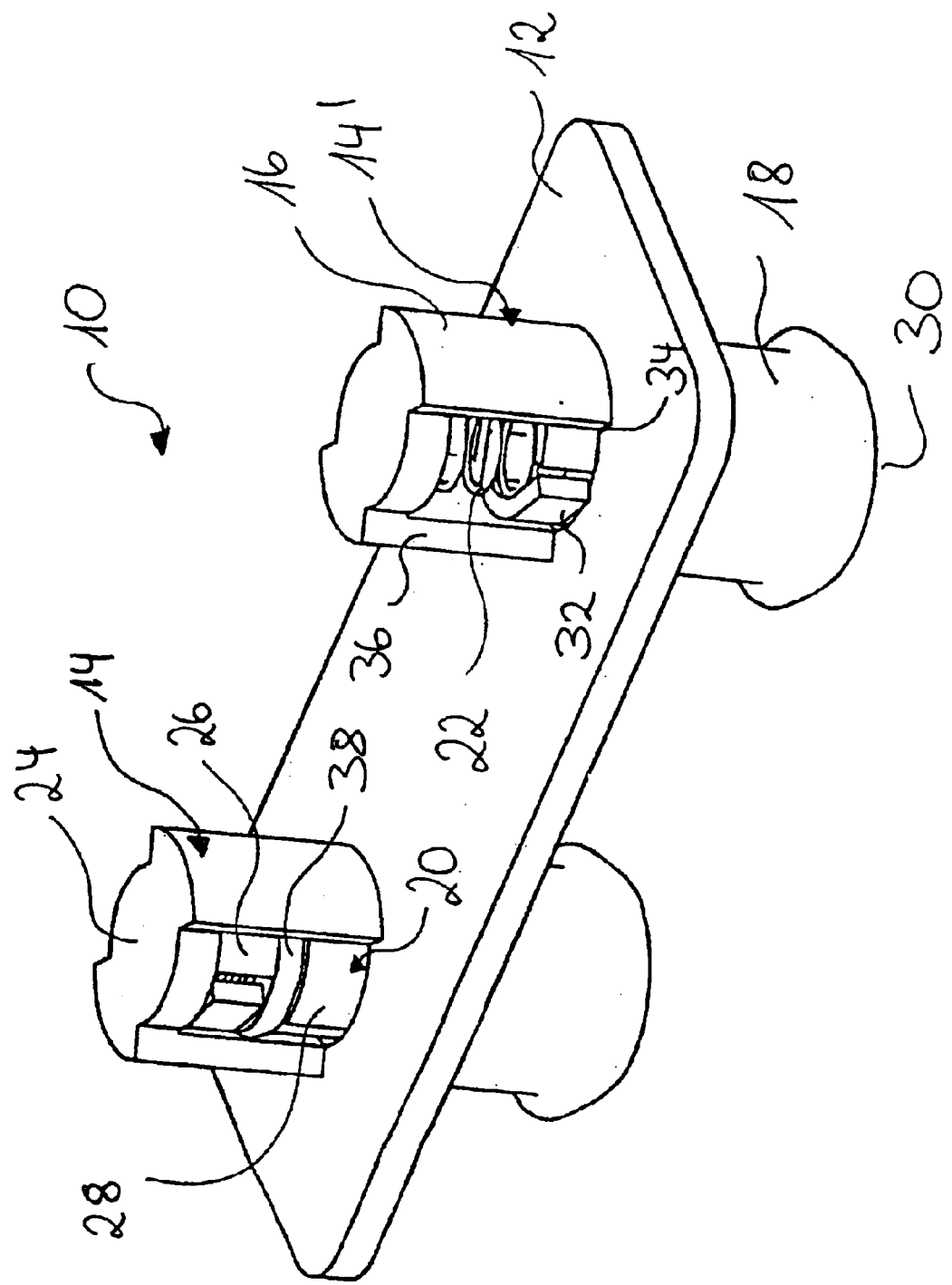
FIG. 1 a cut-out of a first embodiment of a hydraulic fluid container according to the invention in a perspective view.

FIG. 1 shows part of a hydraulic fluid container, generally denoted by 10, for a vehicle hydraulic brake system, namely a bottom wall 12 as well as two cylindrical connecting sleeves 14, 14' formed thereon. The part, not shown here, of the hydraulic fluid container 10 in the form of a plastic injection moulded part is of a style of construction known to persons skilled in the art and is therefore not described in detail below.

The connecting sleeves 14, 14' each comprise a part 16 disposed in the hydraulic fluid container 10 and a part 18 projecting from the hydraulic fluid container 10, wherein in the present case the part 16 disposed in the hydraulic fluid container 10 has the same inside diameter as the part 18 projecting from the hydraulic fluid container 10.

Figure 2:
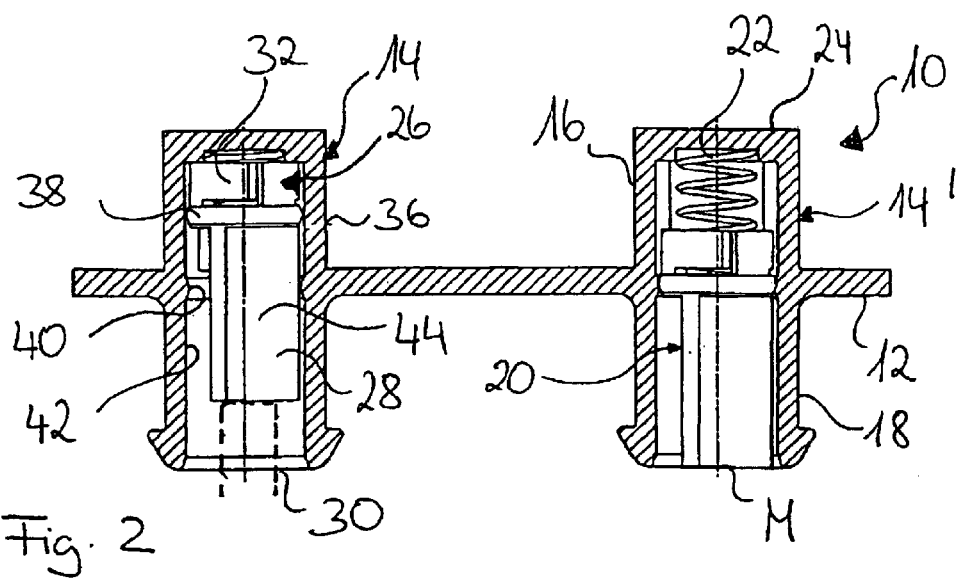
FIG. 2 the cut-out, shown in FIG. 1, of the first embodiment of the hydraulic fluid container according to the invention in section.
Figure 3:
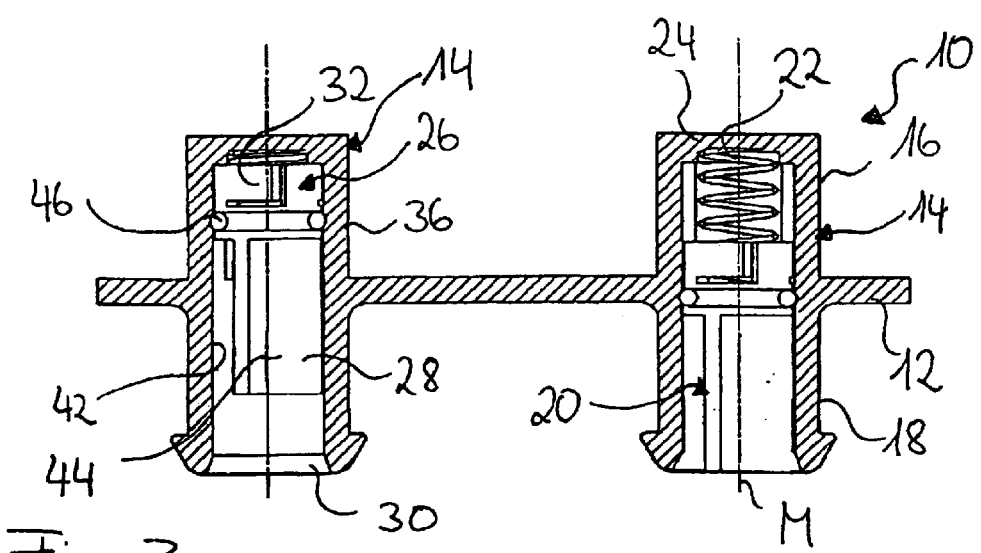
FIG. 3 a cut-out of a second embodiment of the hydraulic fluid container according to the invention in section.

Disposed in each of the connecting sleeves 14, 14' is a valve member 20 in the form of an integral plastic injection moulded part, which is displaceable between a first position shown on the right in FIGS. 1 to 3 and a second position shown on the left. A spring 22, one end of which is supported against an end face 24 of the part 16 of the connecting sleeve 14 disposed in the hydraulic fluid container 10, biases the valve member 20 into its first position.

As is also evident from FIG. 2, the valve member 20 comprises a hollow-cylindrical first portion 26, which receives the other end of the spring 22. A second portion 28 of the valve member 20 has a star-shaped cross section and extends in the direction of an opening 30 of the connecting sleeve 14. Fastened to the first portion 26 are two elastic, tongue-like detent elements 32, which are pivotable about an axis parallel to a centre line M of the valve member and in the mounted state of the valve member 20 engage into breaches 34, which are formed in a side wall 36 of the part 16 of the connecting sleeve 14 disposed in the hydraulic fluid container 10. In the first position of the valve member 20 the detent elements 32 are situated in abutment with the bottom wall 12 of the hydraulic fluid container 10 and hence limit the displacement of the valve member 20 in the direction of the opening 30 of the connecting sleeve 14. In the embodiment illustrated here, the bottom wall 12 of the hydraulic fluid container 10 therefore forms a stop for the detent elements 32, which stop defines the first position of the valve member 20. In the second position of the valve member 20 the detent elements 32 are lifted off this stop and displaced in the direction of the end face 24 of the part 16.

Disposed on the valve member 20, between the first and the second portion 26, 28, is a sealing collar 38, which protrudes slightly in radial direction. In the first position of the valve member 20 the sealing collar 38 interacts with an annular sealing seat 40, which projects slightly in a radially inward direction from an inner surface 42 of the connecting sleeve 14, with the result that the connecting sleeve 14 is blocked and the hydraulic fluid container 10 is sealed off to prevent hydraulic fluid from leaking. In the second position of the valve member 20 the sealing collar 38 is lifted off the sealing seat 40, with the result that hydraulic fluid may flow out of the hydraulic fluid container 10 through the breaches 34 and along flow channels 44 formed by the star-shaped cross section of the second portion 28 of the valve member 20.

As already mentioned, the valve member 20 is biased into its first position by the spring 22. In order to hold the valve member 20 in its second position counter to the spring action, the second portion 28 of the valve member 20 is supported in the manner indicated in FIG. 2 against a master cylinder housing, which is not further illustrated here. In the event of separation of the hydraulic fluid container 10 from the master cylinder, e.g. as a result of an accident, the valve member 20 is displaced from its second position into its first position by the action of the spring 22, wherein by virtue of the interaction of the detent elements 32 with the stops formed by the bottom wall 12 of the hydraulic fluid container 10 it is then ensured that the valve member 20 is not pressed out of the connecting sleeve 14 by the spring action.

The valve member 20, for mounting in the connecting sleeve 14, is introduced into the opening 30 of the connecting sleeve 14. In said case, the elastic detent elements 32 are pressed radially inwards. Because of the restoring forces resulting from the elastic deformation, the detent elements 32 latch in the breaches 34 in the side wall 36 as soon as the valve member 20 has reached a corresponding position in the connecting sleeve 14. During introduction of the valve member 20 the sealing collar 38 is conveyed past the sealing seat 40. In said case, an elastic deformation occurs both at the sealing collar 38 and at the sealing seat 40.

FIG. 3 shows a cut-out of an alternative form of construction of the hydraulic fluid container 10. Instead of the sealing collar 38 shown in FIG. 1, which is formed with the valve member 20 from a uniform material, the valve member 20 comprises an O-ring seal 46, which interacts in a sealing manner with the inner surface 42 of the connecting sleeve 14. Given said form of construction, a sealing seat, e.g. the previously described sealing seat 40, may no longer apply since the radial bias of the O-ring seal 46 is great enough to achieve efficient sealing in cooperation with the side wall 16.

Figure 4:
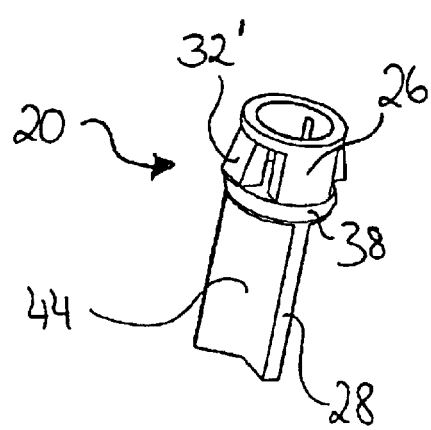
FIG. 4 a perspective view of a valve member for a third embodiment of the hydraulic fluid container according to the invention.

In contrast to the valve members 20 illustrated in FIGS. 1 to 3, the further embodiment of a valve member 20 shown in FIG. 4 comprises detent elements 32', which are pivotable about an axis extending tangentially relative to the circumferential direction of the valve member 20. This offers advantages during mounting of the valve member 20 as the detent elements 32' behave like ramps during introduction of the valve member 20 into the connecting sleeve 14, with the result that the detent elements 32' are pressed radially inwards by the movement of introduction itself. The mounting operation accordingly amounts to nothing more than placing the spring 22 in the hollow-cylindrical portion 26 of the valve member and then inserting the valve member 20 plus spring 22 into the connecting sleeve 14 until the detent elements 32' latch in the breaches 34.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Hydraulic fluid container for a vehicle hydraulic brake system, having at least one connecting sleeve, in which there is a displaceably guided a valve member, which in a first position, into which it is spring-biased, blocks the connecting sleeve and which in a second position clears the connecting sleeve, wherein the valve member on its circumferential surface is provided with at least one radially elastic detent element, and the connecting sleeve in its inner side wall comprises at least one recess, into which the detent element latches during introduction of the valve member into the connecting sleeve and which in relation to the direction of displacement of the valve member forms a stop, which defines the first position of the valve member.

2. Hydraulic fluid container according to claim 1, wherein the connecting sleeve extends into the hydraulic fluid container and the part of the connecting sleeve situated in the hydraulic fluid container has substantially the same inside diameter as a part of the connecting sleeve projecting from the hydraulic fluid container, and that the at least one recess for the at least one detent element is formed in the part of the connecting sleeve situated in the hydraulic fluid container.

3. Hydraulic fluid container according to claim 2, wherein the valve member comprises a first portion, in which the at least one detent element is disposed, and a second portion, which extends in the direction of the opening of the connecting sleeve and acts as an actuating tappet for the valve member.

4. Hydraulic fluid container according to claim 3, wherein the first portion of the valve member is hollow-cylindrical and receives one end of a spring, which biases the valve member and is supported by its other end against the part of the connecting sleeve situated in the hydraulic fluid container.

5. Hydraulic fluid container according to claim 4, wherein the spring is supported against a partially breached end wall, which forms one end of the part of the connecting sleeve situated in the hydraulic fluid container.

6. Hydraulic fluid container according to claim 4, wherein the spring is supported against an end wall, which closes the part of the connecting sleeve situated in the hydraulic fluid container, and that the recess in the inner side wall of the connecting sleeve that interacts with the detent element is a breach.

7. Hydraulic fluid container according to claim 1, wherein the valve member on its outside comprises an annular sealing collar, which protrudes slightly in radial direction and which in the first position of the valve member interacts with an annular sealing seat, which projects slightly in a radially inward direction and which is provided at an the inner surface of the connecting sleeve.

8. Hydraulic fluid container according to claim 7, wherein the annular sealing collar and the valve member are formed from a uniform material, and wherein the annular sealing seat and the connecting sleeve are formed from a uniform material.

9. Hydraulic fluid container according to claim 1, wherein the valve member on its outside comprises an annular sealing collar, which protrudes slightly in radial direction and is in contact with the inner surface of the connecting sleeve, and that the annular sealing collar is formed by an O-ring seal.

10. Hydraulic fluid container according to claim 7, wherein the annular sealing collar is disposed between a the first portion of the valve member, in which the at least one detent element is disposed, and a second portion of the valve member, which extends in the direction of the opening of the connecting sleeve and acts as an actuating tappet for the valve member.

11. Hydraulic fluid container according to claim 1, wherein the at least one elastic detent element is formed by a tongue, which is fastened to the valve member and pivotable about an axis parallel to the centre line of the valve member.

12. Hydraulic fluid container according to claim 1, wherein the at least one elastic detent element is formed by a tongue, which is fastened to the valve member and pivotable about an axis, which extends tangentially relative to the circumferential direction of the valve member.

13. Hydraulic fluid container according to claim 1, wherein the valve member is an integral plastic injection moulded part.

* * * * *

UNITED STATES PATENT AND TRADEMARK OFFICE
CERTIFICATE OF CORRECTION

PATENT NO. : 6,928,814 B2
DATED : August 16, 2005
INVENTOR(S) : Hans-Christophp Lange It is certified that error appears in the above-identified patent and that said Letters Patent is hereby corrected as shown below:

Column 8,
Line 6, after "an" delete "the".
Line 16, after "an" delete "the".
Line 20, after "a" delete "the".

Signed and Sealed this

Twenty-seventh Day of September, 2005

JON W. DUDAS
*Director of the United States Patent and Trademark Office*